Figure 1:
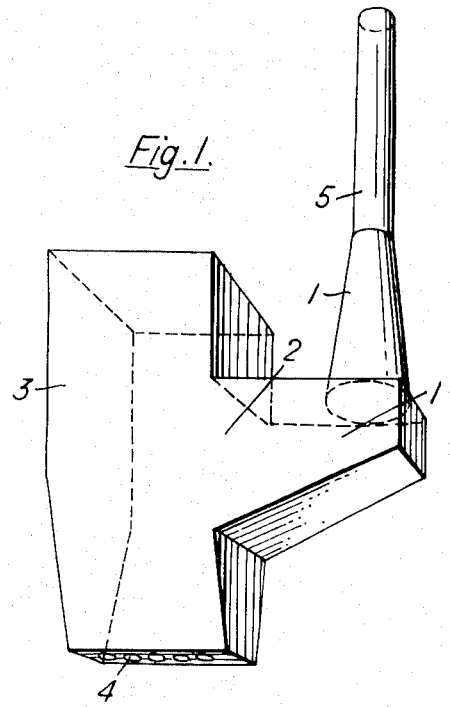

March 22, 1966  K. W. RAMSEY  3,241,296

POLYMERISATION APPARATUS

Filed Oct. 17, 1963

Inventor
Keith Ward Ramsey
By
Cushman, Darby & Cushman
Attorneys

United States Patent Office 3,241,296
Patented Mar. 22, 1966

3,241,296
POLYMERISATION APPARATUS
Keith Ward Ramsey, Goitre, Pontypool, England, assignor to British Nylon Spinners Limited, Pontypool, England
Filed Oct. 17, 1963, Ser. No. 316,893
Claims priority, application Great Britain, Oct. 26, 1962, 40,541/62
3 Claims. (Cl. 55—199)

This invention relates to new and improved polymerisation apparatus for the continuous manufacture of high molecular weight polyamides and more particularly to a separator for piped streams of molten polyamide mixed with steam.

In the manufacture of polyamides by a continuous process it not infrequently happens that the high molecular weight polyamide is obtained in molten form mixed with steam, and it is necessary to separate the latter from the mixture as it issues from a pipe. The steam may have arisen from moisture originally contained in the monomer starting materials, or it may have been chemically evolved in the polymerisation reaction, or it could have been introduced as a non-oxidizing gaseous medium. It will be understood that that polyamide mixed with steam is commonly delivered from the pipe at high velocity. It is possible to conduct the polyamide/steam mixture by means of said pipe into a heated vented vessel, in the bottom of which the molten polyamide collects, to be removed as required, while the steam escapes by the vent. In practice, however, owing to the velocity with which the polyamide and steam emerge from the open end of the pipe, some of the polyamide inevitably becomes spattered on to the walls of the vessel, which become covered with a film thereof. Although it would be expected that this polyamide film, being above its melting point, would constantly run down into the polyamide pool below, it is found in practice that the film tends to accumulate, at least for a sufficient time, for an undesirable degree of degradation of the polyamide to occur. Consequently it is important to effect a separation of the steam and polyamide which gushes from the pipe, which shall be as complete and steady as possible, so that the polyamide runs quietly into the pool while the steam escapes above and projection of the polyamide on to the walls of the vessel is much reduced. After prolonged experimentation it has been found that very efficient separation can be attained by the present separator. The latter is attached to the end of the pipe carrying the mixture of polyamide and steam, and is so constructed that the velocity of the mixture is caused to decrease, and then both polyamide and steam are subjected to a violent change of direction, preferably of about 90°.

Thus the present separator for molten polyamide/steam mixtures flowing from a pipe in continuous polymerisation apparatus consists of an outlet device for said pipe comprising an expansion conduit leading with increasing area of cross-section into the side of a substantially vertical vessel, having one or more perforations at the bottom and a vented top at a point above that part of the vessel intended to contain the molten polyamide until it drains away through the perforated bottom, the axis of said expansion conduit making an angle of 60°–90° with the vertical where it joins the side of said vessel, whereof the portion above the point where the expansion conduit enters has an area of cross-sectional equal to or greater than the greatest area of cross-section of the expansion conduit.

In the present separator the expansion conduit consists advantageously of a pipe of circular cross-section, increasing in diameter as it leads into the side of the aforesaid vessel, which itself is a pipe of circular cross-section substantially at right angles to the expansion conduit where it enters, closed at its lower end with a perforated bottom, and having a diameter equal to or greater than the greatest diameter of the expansion conduit.

The present separator may be conveniently fashioned out of any convenient metal, for example, stainless steel.

The invention is exemplified but not limited by the following embodiments which are illustrated by the accompanying diagrammatic drawings.

In FIGURE 1 of the drawings which illustrates one embodiment of the invention, the reference numerals have the following significance:
(1) The expansion conduit
(2) The end of the expansion conduit having the largest area of cross-section (where it joins the vertical vessel)
(3) The vertical vessel (with open top)
(4) The holes at the bottom of the vertical vessel
(5) The pipe of the continuous polymerisation apparatus down which flows the molten polyamide/steam mixture.

It will be apparent that the molten polyamide/steam mixture flowing down the pipe 5 reaches at 1 a conduit of larger cross-sectional area and at 2 a conduit of still larger cross-sectional area. The velocity of flow of the mixture is consequently much reduced. At 2 the mixture enters in a horizontal direction the vessel 3, where separation of the molten polyamide from the steam occurs. The steam proceeds upwards escaping from the open top of the vessel (or if desired the steam may be piped away) while the molten polyamide falls to the bottom of the vessel, collecting in a pool, whence it flows steadily away through the orifices 4. Thus both the molten polyamide and the steam are subjected suddenly to a change of direction of approximately 90°.

It is to be understood that the pipe 5, to which the present separator is attached, is normally situated within a heated vented vessel (not shown in the drawings) in which the molten polyamide collects (to be drawn off when required). With the use of the present separator relatively little molten polyamide is projected on to the walls of the aforesaid heated vessel, and degradation of the polyamide is greatly decreased for the reasons stated above.

Figure 2:
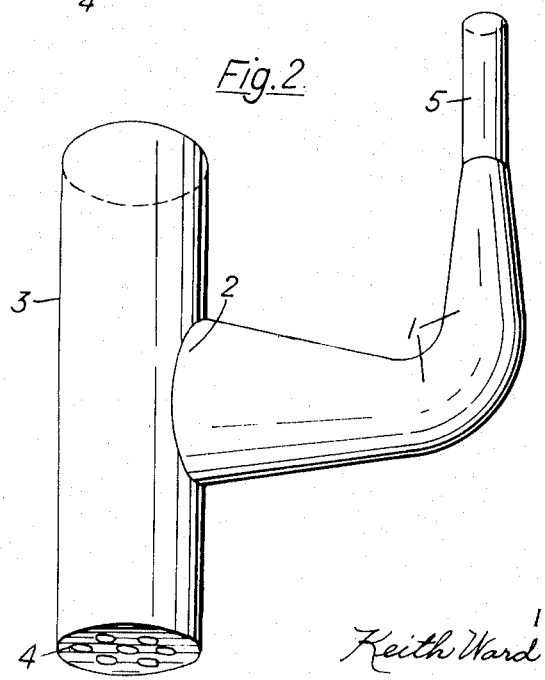

FIGURE 2 which depicts another embodiment of the invention is similarly numbered to FIGURE 1. In this case the vertical vessel does not taper towards its lower end as in FIGURE 1, but the operation of the separator is as described above in respect of FIGURE 1.

What I claim is:

1. A separator for a high velocity stream of molten polyamide/steam mixture, said separator comprising a substantially vertical vessel having side walls, at least one perforation at the bottom and a vented top; an expansion conduit leading with increasing area of cross-section into a side wall portion of said vessel and facing an opposite side wall portion, the opening between said conduit and vessel being substantially the same size as said conduit and being located at a point above that part of said vessel which contains the molten polyamide until it drains away through the perforated bottom, said expansion conduit having an axis in the direction of flow which makes an angle of 60°–90° with the vertical at said point, the portion of said vessel above said point having an area of cross-section at least equal to the greatest area of cross-section of said expansion conduit, and the portion of said vessel at said point being free of internal obstruction whereby the high velocity stream of polyamide/steam emerging from said expansion conduit is separated into polyamide and steam and whereby both the polyamide and steam are subjected to a violent change of direction, the polyamide flowing downwardly and the steam flowing upwardly.

2. Apparatus as in claim 1 wherein said vessel is a pipe of circular cross-section and wherein the axis of said expansion conduit coincides with a diameter of said vessel.

3. Apparatus as in claim 1 wherein said expansion pipe and vessel are constructed of stainless steel.

References Cited by the Examiner

UNITED STATES PATENTS

| 703,819 | 7/1902 | Powell | 55—159 X |
| 815,407 | 3/1906 | Cooper | 55—421 X |
| 960,725 | 6/1910 | Snyder | 55—410 |
| 1,116,931 | 11/1914 | Schutt. | |
| 1,383,984 | 7/1921 | Clark | 55—422 X |
| 1,440,033 | 12/1922 | Stevens et al. | 55—396 |
| 2,460,884 | 2/1949 | Hjort et al. | 55—203 X |
| 2,790,554 | 4/1957 | Work | 55—428 X |
| 2,846,024 | 8/1958 | Bremi | 55—426 X |
| 2,896,740 | 7/1959 | Drummond | 55—421 X |

FOREIGN PATENTS 141,933  9/1953  Sweden.

REUBEN FRIEDMAN, *Primary Examiner.*

J. ADEE, *Assistant Examiner.*